US012424055B2

(12) United States Patent
Bruch et al.

(10) Patent No.: US 12,424,055 B2
(45) Date of Patent: Sep. 23, 2025

(54) SECURE PARTICIPATION WAGERING SYSTEM USING BIN PACKING TO FACILITATE DIGITAL GAMES

(71) Applicant: My Technology, Inc., Coral Gables, FL (US)

(72) Inventors: Zach Bruch, Miami, FL (US); James Seibel, Boston, MA (US); Max Wilson, San Francisco, CA (US)

(73) Assignee: My Technology, Inc., Coral Gables, FL (US)

( * ) Notice: Subject to any disclaimer, the term of this patent is extended or adjusted under 35 U.S.C. 154(b) by 0 days.

(21) Appl. No.: 18/891,561

(22) Filed: Sep. 20, 2024

(65) Prior Publication Data

US 2025/0104510 A1 Mar. 27, 2025

Related U.S. Application Data

(60) Provisional application No. 63/596,448, filed on Nov. 6, 2023, provisional application No. 63/584,831, filed on Sep. 22, 2023.

(51) Int. Cl.
*G07F 17/32* (2006.01)
*G06Q 50/34* (2012.01)

(52) U.S. Cl.
CPC ......... *G07F 17/3225* (2013.01); *G06Q 50/34* (2013.01); *G07F 17/3244* (2013.01); *G07F 17/3288* (2013.01)

(58) Field of Classification Search
CPC ............. G07F 17/3225; G07F 17/3244; G07F 17/3288; G06Q 50/34
See application file for complete search history.

(56) References Cited

U.S. PATENT DOCUMENTS

| | | | | |
|---|---|---|---|---|
| 9,514,615 | B2 * | 12/2016 | Bramble | G07F 17/3227 |
| 2019/0156623 | A1 * | 5/2019 | Thomas | G07F 17/3218 |
| 2020/0111324 | A1 * | 4/2020 | Riggs | G07F 17/3276 |
| 2021/0150854 | A1 * | 5/2021 | Nguyen | G07F 17/3218 |

(Continued)

FOREIGN PATENT DOCUMENTS

WO WO-2005077480 A1 8/2005

OTHER PUBLICATIONS

Livespins, "Livespins x CasinoDaddy", YouTube (Jun. 2, 2023) [online] https://www.youtube.com/watch?v=ycebkp8k3t0; 4 pages.

(Continued)

*Primary Examiner* — Sunit Pandya
(74) *Attorney, Agent, or Firm* — COOLEY LLP

(57) ABSTRACT

A method includes receiving, from a plurality of first compute devices, a group wager to produce a plurality of group wagers, each group wager having (1) a wager amount that is defined at that first compute device and (2) a condition that is based on an outcome of a game that is played by a user of a second compute device that is not included in the plurality of first compute devices. The plurality of group wagers is provided as input to a bin packing model to identify a subset of group wagers. In response to executing the game to determine a winning settlement, an electronic payment amount is sent to a first compute device that is from the plurality of first compute devices and that is associated with that group wager, the electronic payment amount being based on the wager amount of that group wager.

20 Claims, 9 Drawing Sheets

(56) References Cited

U.S. PATENT DOCUMENTS

| | | | | |
|---|---|---|---|---|
| 2021/0350669 | A1 | 11/2021 | Marantelli | |
| 2022/0005314 | A1* | 1/2022 | Harmon | G06Q 50/34 |
| 2022/0005321 | A1* | 1/2022 | Wexler | G07F 17/3244 |
| 2022/0237990 | A1* | 7/2022 | Litman | G07F 17/3225 |
| 2023/0082553 | A1* | 3/2023 | Mendell | G06F 21/604 707/737 |

OTHER PUBLICATIONS

International Search Report and Written Opinion for PCT Application No. PCT/US2024/047812, by My Technology, Inc., mailed Nov. 14, 2024, 12 pages.

* cited by examiner

SECURE PARTICIPATION WAGERING SYSTEM USING BIN PACKING TO FACILITATE DIGITAL GAMES

CROSS REFERENCE TO RELATED APPLICATIONS

This application claims priority to and the benefit of U.S. Provisional Patent Application No. 63/596,448, filed Nov. 6, 2023, and also claims priority to and the benefit of U.S. Provisional Patent Application No. 63/584,831, filed Sep. 22, 2023; the aforementioned applications are incorporated by reference herein in their entireties and for all purposes.

FIELD

The present disclosure relates to systems and methods for facilitating wagers, and more specifically, for facilitating participatory bets.

BACKGROUND

Many known digital games are solitary: individual users assess game odds, place a wager, and are rewarded based upon the outcome of a fair game of chance. Some table-style games, such as blackjack or roulette, can have elements of group participation (e.g., a shared casino card dealer), but players of these games submit wagers on the unique outcome of their individual game and bets, despite playing at a table with one or more other players with one or more shared elements of the game. Thus, a need exists for a system configured to facilitate group wagering.

SUMMARY

Systems and methods for facilitating participatory bets are described herein. In some embodiments, a system includes (or a method includes the use of) a compute device, an inter-network transfer device, and a data storage device. At least some systems and methods set forth herein can be configured to convert a solitary-style game (e.g., a digital casino game, an e-sports game, a video game, etc.) and/or betting event (e.g., an outcome of a sporting match, political election, etc.) into a group participatory wagering experience. In some implementations, these systems and methods can be further configured to generate extended gameplay outcomes. Alternatively or in addition, in some implementations, the systems and methods set forth herein can reduce a risk of excessive monetary loss to an operator (e.g., a casino house).

According to an embodiment, a non-transitory, processor-readable medium stores instructions that, when executed by a processor, cause the processor to receive, via at least one first network socket, (1) first wager data from a first compute device and (2) second wager data from a plurality of second compute devices that excludes the first compute device. The first wager data is associated with a first wager, and the second wager data is associated with a plurality of second wagers. Each second wager from the plurality of second wagers is associated with a second compute device different from remaining second compute devices from the plurality of second compute devices. The second wager data and a threshold wager amount are provided as inputs to a bin packing model to cause identification of a subset of second wagers from the plurality of second wagers. The subset of second wagers is associated with a subset of second wager data from the second wager data.

In response to the identification of the subset of second wagers, the instructions further cause the processor to (1) set a rule specifying that at least one result of the subset of second wagers is based on a result of the first wager and (2) cause the first wager data and the subset of second wager data to be stored, via a second network socket that is different from the at least one first network socket, at a centralized database. The game is executed to produce an outcome of the game, and the result of the first wager is determined based on the outcome of the game and the first wager data that is stored at the centralized database. The instructions further cause the processor to determine the at least one result of the subset of second wagers based on the result of the first wager and the subset of second wager data that is stored at the centralized database. At least one signal is sent, via the at least one first network socket, to cause (1) settlement of the first wager based on the result of the first wager and (2) settlement of the subset of second wagers based on the at least one result of the subset of second wagers.

According to an embodiment, a non-transitory, processor-readable medium stores instructions that, when executed by a processor, cause the processor to receive, via at least one first network socket, a plurality of wager sets from a plurality of compute devices, each wager set from the plurality of wager sets (1) being associated with a compute device different from remaining compute devices from the plurality of compute devices and (2) including a plurality of wagers that includes (i) a first wager that is associated with a first possible result of a game and (ii) a second wager that is associated with a second possible result of the game that is different from the first possible result of the game. The instructions further cause the processor to cause the plurality of wager sets to be sent, via a second network socket that is different from the at least one first network socket, to a centralized database. A first aggregated wager amount is determined based on each first wager from the plurality of wager sets stored at the centralized database, and a second aggregated wager amount is determined based on each second wager from the plurality of wager sets stored at the centralized database.

The instructions further cause the processor to determine a likelihood of the first possible result of the game and a likelihood of the second possible result of the game, based on a plurality of possible results of the game that includes the first possible result of the game and second possible result of the game. A risk value that is associated with each first wager from the plurality of wager sets is determined based on the first aggregated wager amount, the second aggregated wager amount, the likelihood of the first possible result of the game, and the likelihood of the second possible result of the game. In response to the risk value being above a predefined risk value threshold, a stake reduction factor is determined based on the risk value. In response to determining the stake reduction factor, the stake reduction factor is applied, at the centralized database, to (1) each first wager from at least one wager set from the plurality of wager sets and (2) each second wager from the at least one wager set, to produce (i) a first reduced wager for each wager set from the at least one wager set and (ii) a second reduced wager for each wager set from the at least one wager set. The game is executed to determine an outcome of the game from the plurality of possible results of the game, and each first reduced wager from the at least one wager set and each second reduced wager from the at least one wager set is settled based on the outcome of the game.

According to an embodiment, a non-transitory, processor-readable medium stores instructions that, when executed by a processor, cause the processor to receive, from each first compute device from a plurality of first compute devices, a group wager to produce a plurality of group wagers, each group wager from the plurality of group wagers having (1) a wager amount that is defined at that first compute device and (2) a condition that is based on an outcome of a game that is played by a user of a second compute device that is not included in the plurality of first compute devices. The plurality of group wagers is provided as input to a bin packing model to identify a subset of group wagers from the plurality of group wagers based on a threshold wager amount. In response to executing the game to produce the outcome of the game, the instructions further cause the processor to evaluate, based on the outcome of the game, the subset of group wagers and not remaining group wagers from the plurality of group wagers, to determine a winning settlement. In response to determining the winning settlement, an electronic payment amount is sent to a first compute device that is (1) from the plurality of first compute devices and (2) associated with that group wager, the electronic payment amount being based on the wager amount of that group wager.

BRIEF DESCRIPTION OF THE DRAWINGS

It is to be understood that the drawings primarily are for illustrative purposes and are not intended to limit the scope of the subject matter described herein.

DETAILED DESCRIPTION

Systems and methods of the present disclosure can be used to facilitate group wagers (e.g., participatory bets), according to one embodiment. A group wager can refer to a wager (e.g., a bet including a sum of money, fiat currency, cryptocurrency, a token(s), and/or the like) placed by at least one first user, the wager associated with an outcome of a game (e.g., a digital casino game, an e-sports game, a video game, a trivia game, etc.) and/or betting event (e.g., an outcome of a sporting match, political election, etc.) played by a second user. In some implementations, a wager can include, for example, a ticket or token to be used in a lottery or to claim a prize at a later time.

Figure 1:
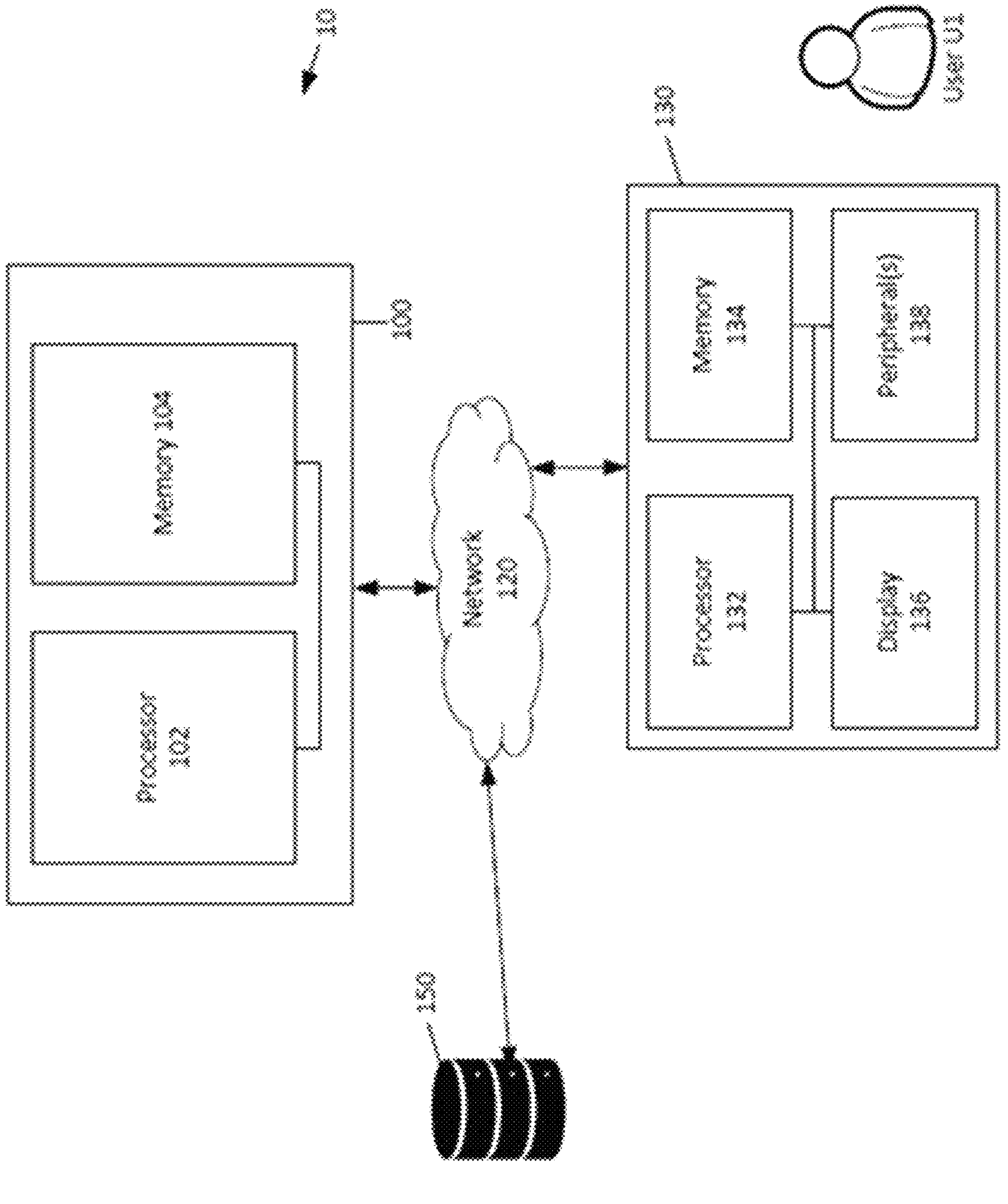
FIG. 1 shows a block diagram of a system configured to facilitate participatory bets, according to some embodiments.

FIG. 1 shows a block diagram of a system 10 configured to facilitate participatory bets, according to some embodiments. The participatory betting system 10 can include a server device 100, a user compute device 130 and/or a database 150, each operatively coupled to one another via a network 120. The methods described herein can be executed by the server device 100 and/or the user compute device 130. Specifically, the various method steps can be executed solely at the server device 100 (e.g., by processor 102), solely at the user compute device 130 (e.g., by processor 132), or the method steps can be executed at a combination of the server device 100 (e.g., by processor 102) and user compute device 130 (e.g., by processor 132).

The network 120 facilitates communication between/among the components of the participatory betting system 10. The network 120 can be any suitable communication network for transferring data, operating over public and/or private networks. For example, the network 120 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 120 can be a wireless network such as, for example, a Wi-Fi or wireless local area network ("WLAN"), a wireless wide area network ("WWAN"), and/or a cellular network. In some instances, the network 120 can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS). The communications sent via the network 120 can be encrypted or unencrypted. In some instances, the network 120 can include multiple networks or subnetworks operatively coupled to one another by, for example, network bridges, routers, switches, gateways and/or the like (not shown).

The user compute device 130 is a device configured to receive requests from a user U1 and present responses to such requests to the user U1. In some instances, the user U1 can include a plurality of users. The user compute device 130 can include a processor 132, memory 134, display 136, and peripheral(s) 138, each operatively coupled to one another (e.g., via a system bus). In some implementations, the user compute device 130 is associated with (e.g., owned by, accessible by, operated by, etc.) a user U1. The user U1 can be any type of user, such as, for example, a gambler, a player, an administrator, a manager, and the like.

The processor 132 of the user compute device 130 can be, for example, a hardware based integrated circuit (IC), or any other suitable processing device configured to run and/or execute a set of instructions or code. For example, the processor 132 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 132 can be operatively coupled to the memory 134 through a system bus (for example, address bus, data bus and/or control bus).

The memory 134 of the user compute device 130 can be, for example, a random-access memory (RAM), a memory buffer, a hard drive, a read-only memory (ROM), an erasable programmable read-only memory (EPROM), and/or the like. In some instances, the memory 134 can store, for example, one or more software programs and/or code that can include instructions to cause the processor 132 to perform one or more processes, functions, and/or the like. In some implementations, the memory 134 can include extendable storage units that can be added and used incrementally. In some implementations, the memory 134 can be a portable memory (e.g., a flash drive, a portable hard disk, and/or the like) that can be operatively coupled to the processor 132. In some instances, the memory 134 can be remotely operatively coupled with a compute device (not shown). For example, a remote database device can serve as a memory and be operatively coupled to the compute device.

The peripheral(s) 138 can include any type of peripheral, such as an input device, an output device, a mouse, keyboard, microphone, touch screen, speaker, scanner, headset, printer, camera, and/or the like. In some instances, the user U1 can use the peripheral(s) 138 to provide data and/or requests to the participatory betting system 10 for analysis at either the processor 132 or the processor 102 of the server device 100. For example, the user U1 can input the data and/or requests using a keyboard included in peripheral(s) 138 to identify the data and/or requests and/or can select the data and/or requests using a mouse included in peripherals(s) 138 to identify the data and/or requests.

The display 136 can be any type of display, such as a Cathode Ray tube (CRT) display, Liquid Crystal Display (LCD), Light Emitting Diode (LED) display, Organic Light Emitting Diode (OLED) display, and/or the like. The display 136 can be used for visually displaying information (e.g., data, results of analyses etc.) to user U1. For example, display 136 can display a chat window where users can input natural language text and/or queries to perform various functions, calculations, modelling and/or processes. Example interfaces that can be displayed by the display 136 can include, for example, a software-implemented interface that includes an overlay for social media video streams, via which participants can navigate to, for example, a virtual casino room hosted by a content creator and make collaborative bets/wagers.

The database 150 stores information related to the participatory betting system 10 and the processes described herein. The database 150 can be any device or service configured to store signals, information, and/or data. For example, the database 150 can store data (e.g., financial information) about an organization, templates, user preferences, data used to test and/or train one or more machine learning models, user data and/or the like. The database 150 can receive and store signals, information and/or data from the other components (e.g., the user compute device 130 and the server device 100) of the participatory betting system 10. The database 150 can include a local storage system associated with the command executing participatory betting system 10, such as a server, a hard-drive, or the like or a cloud-based storage system. In some implementations, the database 150 can include a combination of local storage systems and cloud-based storage systems. In some implementations, the database 150 can be part of and/or stored with the memory 104 and/or the memory 134. In some implementations, the database 150 can be a centralized database (e.g., a database that is not located at the user compute device 130 and/or that is not located at a compute device of a group player or game player).

The server device 100 is configured to receive (or generate) and facilitate execution of requests received from the user compute device 130. The server device 100 can include a processor 102 and a memory 104, each operatively coupled to one another (e.g., via a system bus). The memory 104 can include and/or store one or more machine learning models (not shown). In some implementations, the user compute device 130 is associated with (e.g., owned by, accessible by, operated by, etc.) a user (e.g., a player), and the server device 100 is associated with (e.g., owned by, accessible by, operated by, etc.) an organization and/or casino house. In some implementations, the user compute device 130 is associated with (e.g., owned by, accessible by, operated by, etc.) a first organization, and the server device 100 is associated with (e.g., owned by, accessible by, operated by, etc.) a second organization different than the first organization. In some implementations, the participatory betting system 10 can be associated with a plurality of users (e.g., a game player and one or more group player(s), as described herein). In some implementations, the participatory betting system 10 can include a plurality of user compute devices 130, a plurality of databases 150, and/or a plurality of server devices 100.

The memory 104 of the of the server device 100 can be, for example, a random-access memory (RAM), a memory buffer, a hard drive, a read-only memory (ROM), an erasable programmable read-only memory (EPROM), and/or the like. In some instances, the memory 104 can store, for example, one or more software programs and/or code that can include instructions to cause the processor 102 to perform one or more processes, functions, and/or the like (e.g., the processes and/or functions described herein). In some implementations, the memory 104 can include extendable storage units that can be added and used incrementally. In some implementations, the memory 104 can be a portable memory (for example, a flash drive, a portable hard disk, and/or the like) that can be operatively coupled to the processor 102. In some instances, the memory 104 can be remotely operatively coupled with a compute device (not shown). For example, a remote database device can serve as a memory and be operatively coupled to the compute device.

In use, the user compute device 130 can receive a request from the user U1 (e.g., via the peripheral(s) 138). The user compute device 130 can send the request to the server compute device 100 via the network 120. The processor 102 of the server compute device 100 can execute the request (e.g., using code stored in memory 104 and executed by the processor 102) as described above. The result of the request can then be sent to the user compute device 130 via the network 120 and displayed to the user U1 via display 136.

While discussed above as being executed at the server device 100, any portion of a request can be executed at the user compute device 130. For example, some or all of the functions described as being executed on the server device 100 (described above) can be executed at the processor 132 of the user compute device 130. For example, in some embodiments, no server device 100 is used and the functions and/or processes described above are executed at the user compute device 130.

In some implementations, during use/operation, the user compute device 130 can receive indications/representations of wagers and/or cause transmission of (or send) indications/representations of outcomes to a game player and/or to one or more group players. In some implementations, the game player and/or the group player(s) can interact with the server device 100 via an interface(s) (e.g., a graphical user interface (GUI), a digital dashboard, etc.) associated with a compute device(s) 130. For example, the game player can participate in a game via a first GUI executed via a first compute device 130. In response to the game player participating in the game, at least one second compute device 130 (e.g., that is different from the first compute device 130) can cause display of at least one second GUI to at least one group player. The second GUI can include a user-selectable element (e.g., a digital button) that a group player can select to wager on the game being played by the game player. The server device 100 can be configured to execute at least a portion of a process (e.g., the process illustrated in FIG. 2). In some implementations, data (e.g., wager data, configuration parameters, bet slip data, outcome data, and/or the like) generated by the process can be stored in the database 150. Wager data can include, for example, an outcome choice (e.g., that the game player will win or lose, that the game result will be a particular outcome (e.g., for roulette, black), that a particular team playing the game will win, etc.), a wager amount (e.g., a stake value), etc.

Figure 2:
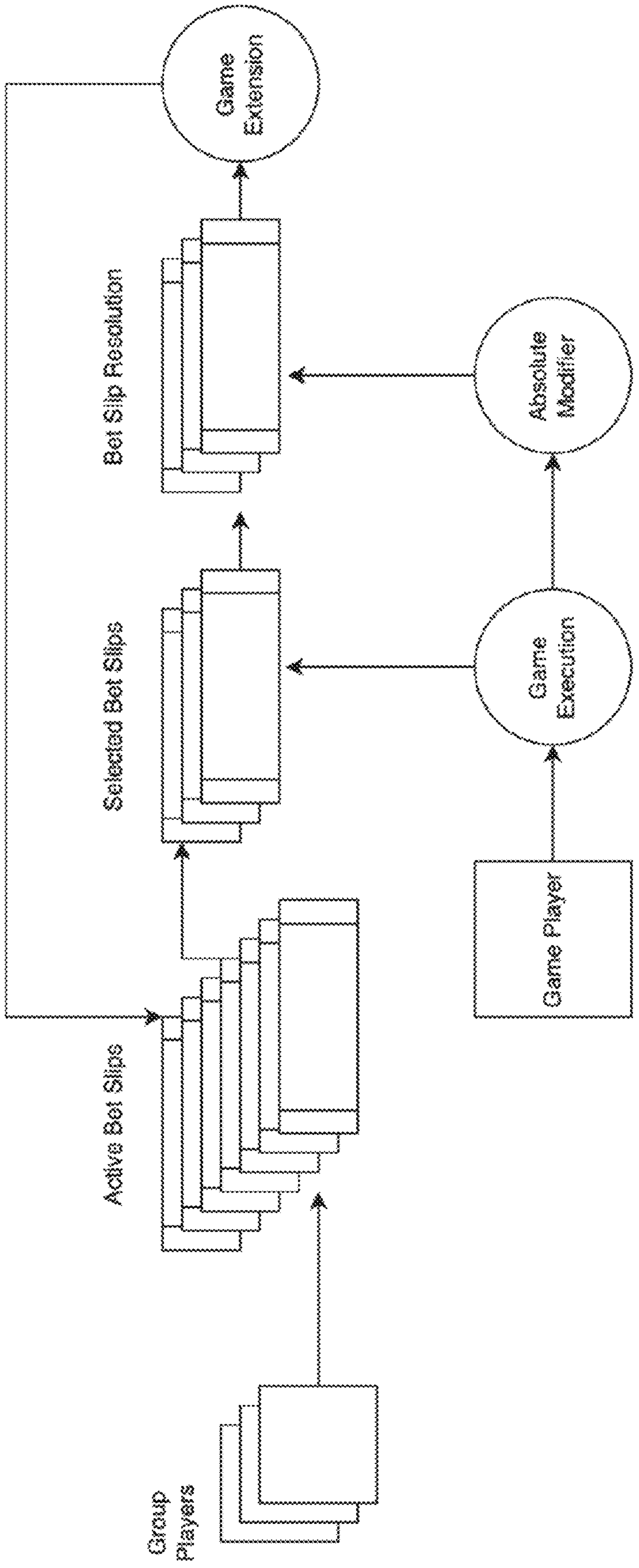
FIG. 2 shows a block diagram illustrating a process flow associated with a system configured to facilitate participatory bets, according to some embodiments.

FIG. 2 shows a block diagram illustrating a process flow associated with a system configured to facilitate participatory bets (e.g., a system similar to participatory betting system 10 of FIG. 1), according to some embodiments. The process can involve, for example, two types of players. The first type of player can include a game player. By way of example only, a game player can include a single casino player that can place a wager and/or execute a casino game bet. The second type of player can include a group player. At least one group player can include, by way of example only, at least one casino player that can wager on an outcome(s) of the game executed by the game player. In some instances, by way of example only, a plurality of group players can wager on the outcome(s) of the game executed by the game player. Each group player can configure their respective wager using a bet slip (labeled “Active Bet Slips” in FIG. 2). A bet slip can include at least one indication (e.g., parameter(s)) associated with at least one of a bet size, a number of games, and/or a game extension configuration, as described herein. For example, a group player may wager 100 units of currency per game for a total of 5 games, which is a total bet slip of 500 units of currency. Data associated with the bet slip can be transmitted via an inter-network transfer process and stored in a memory associated with, for example, a database and/or a digital casino game server (DCGS).

In some implementations, the system can include a software-implemented overlay for social media video streams, via which participants can navigate to, for example, a virtual casino room hosted by a content creator and make collaborative bets/wagers. In some instances, the content creator can be a game player and the participants can be group players, and the participants can make bets based on the outcome of a bet placed by the content creator. Similarly stated, a group player can make a bet that has a condition (e.g., a condition for producing a payout), and the condition can be based on the outcome (e.g., a winning outcome, a losing outcome, etc.) of a game being played by a game player. The game player and/or the group players may send requests to a server (e.g., the server device 100 of FIG. 1) via the software-implemented overlay, for example by interacting with a GUI or other interface.

The system can be configured to permit each group player from the at least one group player and/or the plurality of group players to place a wager based on the outcome(s) of one or more future casino games and/or bets (e.g., one or more games and/or bets executed by a game player). Each group player can choose a bet size (e.g., a wager amount) and/or a number of games (e.g., via a graphical user interface), as described herein. In some implementations, each group player can input to the system an indication of a total amount (e.g., the bet size multiplied by the number of games, as described herein) associated with their wager, the indication provided by the user at a betting time/instance. The system can be configured to prohibit and/or exclude a subsequent indication(s) of an amount not included in the indication of the total amount, the subsequent indication(s) received at a time/instance subsequent to the betting time/instance. By way of example only, a group player can wager 100 units of currency per game for 5 total games, which can result in a total bet slip amount of 500 units of currency.

Alternatively or in addition, in some implementations, each group player can provide as input to the system an indication(s) of a game extension configuration, which can include, by way of example only, a parameter(s) that can configure the system to automatically modify the contents of the bet slip based upon the outcome of one or more games. The indication(s) of the game extension configuration can cause a wager(s) of a group player(s) to be automatically wagered (referred to as a “Game Extension” in FIG. 2) on a subsequent game.

An example of a game extension configuration parameter(s) that a group player can configure can include a game number extension parameter. The game number extension parameter (also referred to herein as a game extension parameter) can indicate, by way of example only, a percentage of winning bets (e.g., 10%, 50%, and/or any other suitable percentage less than or equal to 100%) that can be automatically re-wagered on a winning outcome(s) of a game. Similarly stated, the system can partition a first payout amount (also referred to herein as a settlement amount and/or a payment amount) of a winning bet, based on the game extension parameter, to produce a second payout amount (e.g., a contemporaneous payout amount) and a re-wager amount that is associated with a subsequent game. The game number extension parameter can multiply the group player’s winnings by the provided percentage and can cause the resulting amount (e.g. the re-wager amount) to be re-bet into the existing bet slip, thereby extending the number of games.

By way of example, a group player can set their game number extension parameter to be 50%. If, for example, the group player then wins 500 units of currency, the system can automatically (e.g., without human intervention) add 250 units of currency to the bet slip. As a result, the system can extend gameplay for the group player. If the additional units of currency are not enough to fulfill a full game at a given threshold bet size (e.g., as indicated by the user), then the units of currency can be stored unused until the bet size amount is reached (e.g., until the accrued units of currency are not less than the bet size) by additional winning game outcomes. As a result of the accumulated currency reaching or surpassing the bet size amount, the bet slip can be extended by an additional game(s).

In some implementations, a group player can also set a bet size increase parameter, which can indicate, by way of example only, a percentage of winning bets (10%, 50%, etc.)

that can be automatically (e.g., without human intervention) re-wagered on every winning outcome of a game (or a subset thereof). The bet size increase parameter can increase a future bet(s) remaining on the bet slip by an equivalent amount.

By way of example only, if a group player sets their bet size increase parameter to 50%, and the user wins 500 units of currency, and 10 games remain on their bet slip with a corresponding bet size of 100 units of currency, then 25 units of currency can be automatically added to the bet size for each future bet, increasing the bet size of the remaining 10 games in the bet slip to 125 units of currency.

In some implementations, different game extension configuration parameters can be combined, provided the sum of respective percentages indicated by the different game extension configuration parameters do not exceed 100%. By way of example only, a group player can set the game number extension parameter to 25% and the bet size increase parameter to 25%. In this instance, both parameters can apply to the outcome of winning bets, and a remaining 50% of winning bets can be returned to the user as unencumbered bet winnings.

In some implementations, the system can be configured to protect an operator (e.g., a casino house) that is operating the game and/or betting environment. For example, the system can be configured to impose a betting limit (e.g., a predefined threshold) on a total (e.g., absolute) size/amount (e.g., currency amount) of all group player wagers combined (also referred to herein as the "betting pool" or "bet pool") for the next individual outcome of a game (e.g., a casino game)/betting event. As a result of group players sharing in the outcome of a single bet, rather than individual outcomes of individual bets, the operator and/or casino house can be at amplified risk of catastrophic loss if, for example, all or a substantial number of group players have a probabilistically rare (e.g., statistically significant, unlikely, and/or substantially unlikely) number of outsized wins. The system can be configured to select (using, for example, the selection process shown in FIG. 3) some number of bet slips (referred to as "Selected Bet Slips" in FIG. 2) from the Active Bet Slips to result in a betting pool that has a total (e.g., absolute) size (e.g., wager amount) that is under the betting limit.

Figure 3:
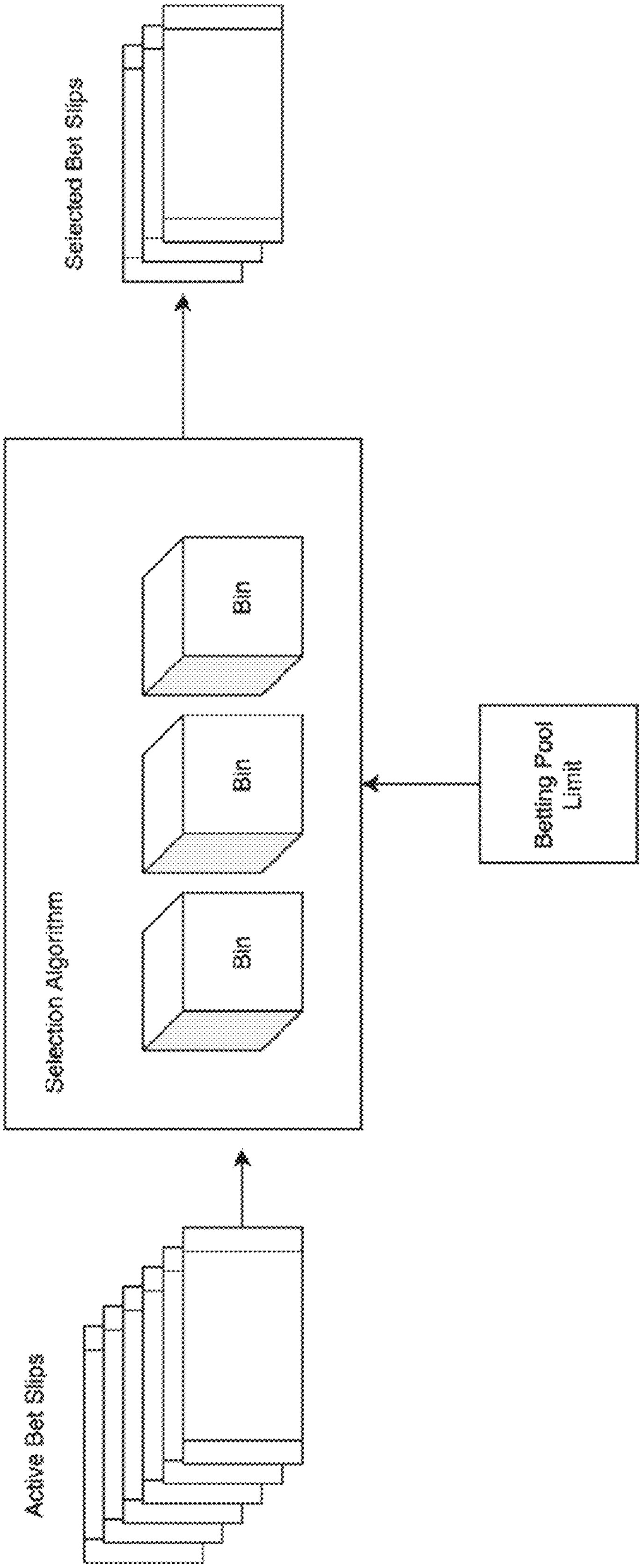
FIG. 3 shows a block diagram illustrating a process for selecting bet slips associated with a system configured to facilitate participatory bets, according to some embodiments.

FIG. 3 shows a block diagram illustrating a process for selecting bet slips (a "selection process") associated with a system configured to facilitate participatory bets, according to some embodiments. The process of FIG. 3 can be implemented, for example, using a system similar to participatory betting system 10 of FIG. 1. For example, the selection process (labeled "Selection Algorithm" in FIG. 3) can include ranking individual bet slips for respective group players based on the size (e.g., amount) of each bet and then stopping selection when the next bet would exceed the limit. Alternatively, the selection process may use a bin packing model (or a similarly configured optimization model and/or algorithm), such as Harmonic-k, configured to perform "bin packing," such that an increased number of bets (e.g., a maximized number of bets) is packed/included without the betting limit being exceeded. Bin packing is described further, for example, in relation to FIG. 4. As shown in FIG. 3, as a result of the selection process, the system can be configured to generate "Selected Bet Slips" that can be less in number than (e.g., a subset of) the "Active Bet Slips" that are input into the selection process.

In some implementations, before a game player executes a next game (e.g., casino game)/betting event, the operator of the game/betting event (e.g., a casino house) can dynamically modify (e.g., via a dynamic selection process) the bet limit via the system. As a result of the dynamic modification, the system can automatically (e.g., without human intervention) adjust the selection process for bet slips to ensure that the modified bet limit is not exceeded.

When the game player (e.g., a single player) places a wager and/or executes, for example, a casino game, the selection process can be executed such that one or more existing bets that are under the betting limit and from the participatory bettor(s) (e.g., the group player(s)) are "locked in"/not modifiable. The output of the casino game can then be revealed and the game player can, in some instances, receive a resulting payout. The absolute (e.g., cumulative) value of the payout to be paid to the participatory bettor(s) can be converted to a multiplier (as described herein), which can then be applied to each bet slip that was accepted by the system via the selection process.

By way of example only, if a game player wagers 100 units of currency and receives 200 units of currency as the outcome, then the multiplier can be 2.0. If the game player wagers 100 units of currency and receives 50 units of currency as the outcome, then the multiplier can be 0.5. If the game player wagers 100 units of currency and receives 0 units of currency, then the multiplier can be 0.0 (e.g., a bet loss).

Individual bet slips can be resolved by applying the multiplier to each bet slip (resulting in a "Bet Slip Resolution" as shown in FIG. 2). In some implementations, the multiplier can be modified for an individual bet slip(s). By way of example only, such modifications (referred to as an "Absolute Modifier" in FIG. 2) can be applied to the bet slip(s) for bonus and/or promotional reasons, causing the multiplier to be different from (e.g., greater than) the absolute value. For example, the multiplier for group player A and group player B can be 2.0, but because of a promotional element applied to the multiplier for group player C, that multiplier for group player C can be 2.75.

To resolve a bet, the multiplier can be applied to the total bet size for that game. For example, if each of group player A and group player B wagers 100 units of currency and receive a 2.0 multiplier, each group player can receive back 200 units of currency from the system. If group player C wagers 200 units of currency with a 2.75 multiplier, group player C can receive back (i.e., may be "paid out") 550 units of currency.

The sum of the results of all individual wagers can be referred to as the betting pool payout, which can be tracked and stored in a digital storage device (e.g., a device that includes at least one memory) such that historical results for a group associated with the individual wagers can be retrieved and caused to be displayed.

After payout (e.g., settlement) of a bet slip(s) to a group player(s) is complete, the system can repeat a process of accepting wagers for the outcome of a next game. As result of a bet slip including an indication of the number of games that bet slip is active for, the size of the betting pool can be automatically increased by the summation of all active bet slips.

In some implementations, at a time before the game player executes a next game/betting event (e.g., a casino game), a group player can modify, via the system, their active bet slip or cancel their active bet slip. If the bet slip is increased in size (e.g., total size, total amount and/or number of games), the system can cause the group player to promptly, immediately, and/or automatically wager (e.g., pay) the sum of currency corresponding to the increase. If the group player decreases or cancels their bet slip, the amount of currency removed by such an action can be promptly/automatically returned to the group player via the system.

In some implementations, in an example process implemented by the system (e.g., the participatory betting system 10 of FIG. 1), a game player can be associated with a game server, and can send instructions to the game server (e.g., by interacting with a GUI as described herein), for example to specify, define, or request one or more parameters of a game to be played (e.g., one or more of: a game identifier, a start time for the game, an end time for the game, a duration of the game, a number of rounds or hands of the game, one or more permissible wager amounts, a maximum wager amount, a minimum wager amount, one or more times when a wager or wagers can be made, etc.). The game can comprise software code. The game player can communicate with the game server, for example by causing a "start participatory game" request to be sent to the game server (e.g., by interacting with a GUI or other user interface). In response to receiving this request, the game server can cause the requested game to be opened or initiated (e.g., by causing a software application associated with the game to be launched/deployed, for example via a software-implemented overlay, optionally presented/displayed concurrently with a social media video stream that is viewable by the game player and/or by the group players), and can enable one or more group player(s) to submit one or more associated bet slip(s) (e.g., via the software-implemented overlay). The game server can manage this portion of the process via data communication(s) to/from compute devices of both the game player and the group player(s). A current state (and, optionally, historical state(s)) of the game server can be stored in disk-based storage and/or using in-memory storage.

One or more bet slips can be stored in a database (e.g., database 150 of FIG. 1) operatively coupled to the game server, such that multiple bet slips can be updated with increased speed and/or efficiency, for example when a game begins and/or when a game result is updated, and/or so that retrieval of a subset of bet slips (e.g., for one or more specified group players, for one or more specified dates or date ranges, etc.) can be performed quickly and efficiently (e.g., in a centralized manner). In some implementations, a centralized database with a single table for bet slips is used, so that the game server can respond to games within a strict time limit (e.g., less than 300 milliseconds) and the game player can continue to play the game without delay(s). Using a single/individual database can mitigate or prevent issues related to data replication, network delay(s), and/or data transfer times.

In some implementations, when the game player begins a game, he/she may cause a command, setting and/or parameter to be sent to the game (implemented in software) to cause an update to a visual appearance of a user interface to show a total wager size of the betting pool. This visual appearance update feature may be enabled or disabled, for example by the game player. Total wager size data can be sent from the game server to the game. When the result of the game is known, a signal representing the result of the game may be sent to the game server (i.e., the game server can be notified/informed), and one or more bet slips can be updated efficiently based on the outcome. Individual game players (e.g., the game player and/or the group player(s)) can be informed of the result of the game automatically, for example as a result of the system (e.g., system 10 of FIG. 1) sending an indication(s) of an event(s) to compute devices of the individual group players and/or to the game player, e.g., via a network socket (e.g., a software component that is associated with a network protocol (e.g., a TCP/IP protocol) and is configured to define a software association with a network having the network protocol) and/or for display via the user interface.

Bet slip and game result information can be stored in a plurality of tables included in the database. For example, a bet slips table from the plurality of tables can include data associated with pending, active, and/or terminal bet slips. A second table (a "balances table") from the plurality of tables can store balances for each game and/or for each group player. A third table from the plurality of tables can store a record(s) of a modification(s) to the balances table. A fourth table from the plurality of tables can store data associated with each individual bet made by a game player. The game server can then link credit and debit data (e.g., balance data) to individual bets, and individual bets to one or more bet slips.

Software modules included in the game server can be associated with (or can have a structure that constitutes) a tiered model that includes a plurality of tiers. A first tier can accept requests, via a first network socket, from a requester(s) (e.g., a group player(s), game player, and/or games that are submitting actions and requesting information). This first tier can validate that a given requester can access (e.g., via permissions and/or capabilities) one or more desired resources. The first tier can also cause the requested action to be executed and/or retrieve the specific information/resources requested by the requester. Once validated, a second tier can interact with the database and/or in-memory storage, via a second network socket, to cause any desired/triggered modifications and/or to retrieve any desired/implicated data. This data can be sent to the first tier to encapsulate the data (e.g., to protect sensitive data), and the first tier can transmit the encapsulated data to the requester. The first network socket can be associated with a first permission level (e.g., that permits the requester to submit and/or request information), and the second network socket can be associated with a second permission level that is elevated compared to the first permission level. For example, the second permission level can exclude the requester from accessing the database. In some instances, both the first and second tiers can send data via a network socket(s) directly to a requester, bypassing the encapsulation process, such that the requester of the data can receive the data with increased speed and/or efficiency.

Figure 4:
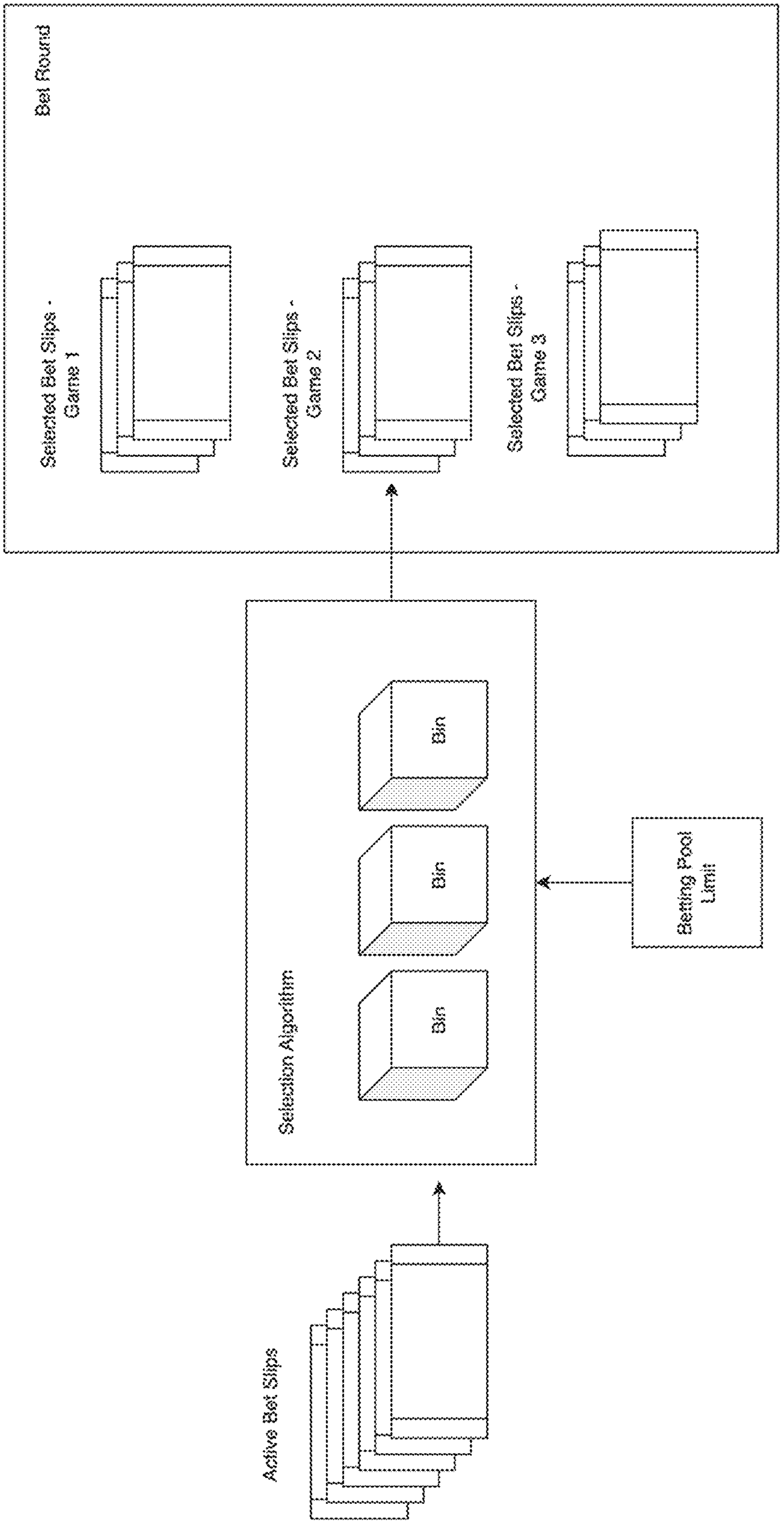
FIG. 4 shows a block diagram illustrating a process for performing bin packing of bet slips associated with a system configured to facilitate participatory bets, according to some embodiments.

FIG. 4 shows a block diagram illustrating a process for performing bin packing of bet slips associated with a system configured to facilitate participatory bets, according to some embodiments. As described herein, the participatory betting system (e.g., the participatory betting system 10 of FIG. 1) can perform bin packing to designate (e.g., identify and/or cause identification of) an increased number of bet slips (e.g., a maximized number of bets) as "Selected Bet Slips" without the betting limit being exceeded. For example, the participatory betting system can define a plurality of bins (e.g., betting pools or betting sub-pools relative to an aggregate betting pool) associated with a plurality of games (e.g., one bin for each game and/or each bin from the plurality of bins being uniquely associated with a different game from the plurality of games). The participatory betting system can use a bin packing model (e.g., a Harmonic-k model and/or the like) to sort/distribute Active Bet Slips and/or Selected Bet Slips into individual games based on respective betting limits for each individual game. Sorting an Active Bet Slip to a bin (e.g., an individual game) can cause the Active Bet Slip to be a Selected Bet Slip. Once a bet slip is associated with an individual game (e.g., as a result of being sorted into a bin), the bet slip can be "locked in" as to a Bet Round. Similarly stated, the participatory system can define a rule for a bet slip once a bet slip has been identified for a game via the bin packing model, where the rule specifies that a condition(s) of the bet slip is predicated on (e.g., triggered by) an outcome(s) of the game. A Bet Round can include one game or multiple games (the latter shown, by way of example, in FIG. 4).

In some instances, when a Bet Round includes multiple games, each game from the multiple games has its own wagering result that can determine its outcome. Alternatively or in addition, when a Bet Round includes multiple games, each game from the multiple games can have one or multiple different game players, as compared to any remaining games from the multiple games, such that different game players can play the one or more games concurrently. Alternatively or in addition, in some instances, when a Bet Round includes multiple games, one or more game players may be common to one or more of the multiple games, such that the one or more game players can play the one or more games sequentially (e.g., according to a predefined order). In these instances, bet slips can be resolved in an order as determined by the bin and/or game order to which that bet slip is assigned. As a result of the bin packing, (1) arbitrarily large betting pools (e.g., aggregate betting pools) can be accommodated by, (2) arbitrarily large wagers can be accommodated by, and/or (3) an arbitrarily large number of bet slips can be included in, one or more betting pools and/or games, increasing the conversion of Active Bet Slips to Selected Bet Slips. For example, a betting pool may be spread across/among multiple games, for example to reduce an overall risk associated with the participatory betting system.

As a further result of performing the bin packing (e.g., via a bin packing model), the system can maximize (or increase) the number of group wagers that are evaluated for a given game. Each execution (via a processor) of a game, therefore, can serve a maximum/maximized (or increased) number of group wagers. Similarly stated, for a given number of group wagers, the system can reduce the number of games involved in serving the group wagers and, therefore, can reduce the utilization of compute resources (e.g., processor resources, memory resources, bandwidth resources, etc.) that is involved while executing a game. Moreover, group wagers that are not selected for a first game can be assigned by the system to a second game (e.g., a game associated with another game player, a game played subsequent to the first game, etc.). This automatic reassignment of group wagers to games can prevent resources (e.g., bandwidth consumed by transmission of group wagers) from being otherwise wasted if unselected wagers were, for example, rejected once the selected bets exceeded the threshold wager amount.

Figure 5:
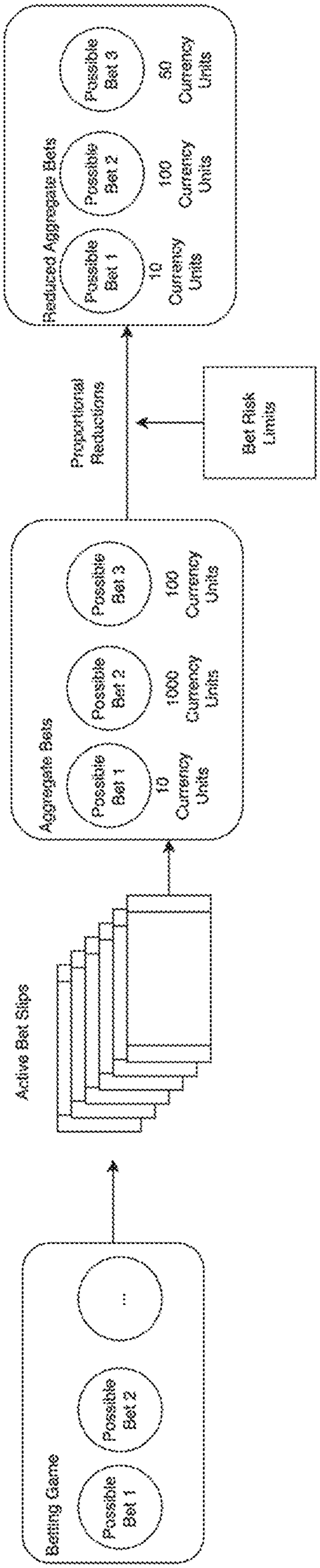
FIG. 5 shows a block diagram illustrating a process for scaling bet sizes included in aggregated bet slips associated with a system configured to facilitate participatory bets, according to some embodiments.

FIG. 5 shows a block diagram illustrating a process for scaling bet sizes included in an aggregated set of bet slips associated with a system configured to facilitate participatory bets, according to some embodiments. For example, in some implementations, one or more bet sizes can be scaled to facilitate a pooling of bet slips from a plurality of group players within the same game, where the group players are not copying the bet (e.g., the outcome guess) of the game player that executes the game to generate the outcome. Said differently, the group players and the game player can (e.g., concurrently or within a common time period) bet on an outcome of a game, but the choices (e.g., guesses) for that outcome can be different between a group player and the game player and/or between/among two or more group players. An example of such a game can include a game of chance such as roulette, where both a game player and a group player(s) can make independent choices (e.g., guesses) for the outcome of the game (e.g., whether the ball lands in/on one of many equally likely slots having a specific number and/or color, an odd or even number, etc.). Another example of such a game is plinko, where a game player and a group player(s) can bet on a number that one or more balls dropped from a height (e.g., from a top of a tower)_will land on.

Roulette, plinko, and other games can be distinguished from, for example, slot machines, which do not solicit outcome choices from players but instead solicit only the choice of wager amount and whether to start a spin. Thus, unlike slot machines, games such as roulette, plinko, and the like can permit concurrent betting from multiple players, where each player can choose to bet on an outcome(s) from at least two possible outcomes. As a result of having multiple possible outcomes, a game can have an associated "balance" of bets. A game can be balanced if the risk to a betting operator (e.g., a casino and/or operator of the game) is equalized (or substantially equalized) across all bets regardless of what the outcome is. For example, a game having two possible outcomes can be balanced if the betting operator would payout the same amount or substantially the same amount (e.g., within 20%) if the game were to result in either of the two outcomes. As a result of this balance, risk to the betting operator can be reduced because the operator does not face a disproportionately large payout for one possible outcome as compared to the other possible outcome.

On the other hand, a game can be unbalanced if one or more possible outcomes risks a disproportionately large payout relative to another possible outcome(s). For example, a game of roulette can have a table where 1 unit (e.g., 1 token, 1 unit of currency, etc.) is on red, and 10,000 units are on the number 5. While the probability for the number 5 to "hit" (e.g., to be the result/outcome of a roulette game) can be relatively small (e.g., 2.6% on a 28 slot roulette table), if that result had a 35 to 1 payout ratio, the betting operator would need to payout 350,000 units if the game were to have that result. As a result of expected variances in outcomes (e.g., in the previous example, the number 5 can hit several times in a row), some betting operators can face losses that affect their profitability. To mitigate this expected variance, some betting operators limit the size of the total number of bets associated with a game (e.g., the size of a table bet) and/or the number of individual players that can bet on and/or play the game.

In some embodiments of the present disclosure, a participatory betting system (e.g., the participatory betting system 10 of FIG. 1) can permit an arbitrarily large number of game players and/or bet sizes while reducing risk and/or losses to a betting operator. In at least one such embodiment, a game player can select (e.g., via a graphical user interface) one or more individual bets, each for some unit(s) of currency, that they desire to make on a given game (e.g., a given table, virtual table, etc.). These one or more bets can be included in a bet slip. After each game player has created their respective bet slips, the participatory betting system can then determine the total amount wagered across all possible bets and/or outcomes associated with the game. The participatory betting system can then calculate the likelihood of each outcome and the payout amount associated with each outcome (e.g., including weighing the probability of each possible or wagered outcome). For outcomes that represent a risk of a disproportionately large payout (e.g., relative to the other possible outcomes), the participatory betting system can scale down a bet size(s) to reduce the risk of loss to the betting operator. Bet sizes can be scaled based on, for example, a risk metric (e.g., a maximum payout threshold, a maximum loss threshold, a risk parameter of a casino treasury, etc.) and/or to ensure that the risk to the betting operator is within expected and/or predefined bounds.

In some instances, a participatory betting system can reduce aggregate bets to reduce the risk of loss to the betting operator and/or to maintain a betting operator's "edge," advantage, etc. For example, the participatory betting system can select a game player for bet scaling, and multiple bets associated with that game player can be scaled down/reduced, e.g., proportionally to each other such that the game player's betting strategy is maintained. For example, if a certain game player is playing roulette, and the game player places 50 units of currency on red and 20 units of currency on the number 3, and the betting operator determines the number 3 has (e.g., proportionally) too many bets relative to other possible bets, the participatory betting system can select one or more game players and, for each game player, reduce the bet sizes proportionally for each bet placed by that game player. As a result, a total number of bets and/or a total bet size associated with the game can be maximized while the exposure and/or risk of any single bet is reduced. If the game player from the previous example is selected for bet scaling by an amount of 50%, then as a result of the scaling, the bet size for their bet on red can be 25 units and the bet size for their bet on 3 can be 10 units of currency. In this way, the game player's betting strategy (e.g., the size of each bet relative to other bets associated with the game player and the game) can be maintained, while their bet slip can have a total bet size (e.g., wager amount) that conforms with the betting limit and/or a maximum permissible wager for the game.

As shown in FIG. 5, a betting game can have at least two possible bet choices (e.g., possible bet 1, possible bet 2, and possible bet 3). One or more game players can each choose to wager on the betting game by defining/submitting a bet slip(s). For example, each game player from a plurality of game players can define and/or initiate an Active Bet Slip, resulting in a plurality of Active Bet Slips (e.g., a betting pool). In some instances, an individual Active Bet Slip (e.g., associated with a game player) can include a plurality of bet choices, and the game player wagers a same amount and/or a different amount for each bet choice (or for a subset of the available bet choices). The participatory betting system can select from the Active Bet Slips one or more Active Bet Slips for bet scaling, based on one or more aggregate bets. For example, as illustrated in FIG. 5, and for a given game, a first aggregate bet (representing one or more Active Bet Slips) can be associated with a first possible bet ("Possible Bet 1") and can include an aggregate wager of 10 currency units. A second aggregate bet (representing one or more Active Bet Slips) can be associated with a second possible bet ("Possible Bet 2") and can include an aggregate wager of 1000 currency units. A third aggregate bet (representing one or more Active Bet Slips) can be associated with a third possible bet ("Possible Bet 3") and can include an aggregate wager of 100 currency units.

Based on a bet risk limit(s) (e.g., a maximum payout threshold, a maximum loss threshold, a risk parameter of a casino treasury, etc.), the participatory betting system can analyze the aggregate bets to determine whether one or more of the aggregate bets exceeds the bet risk limit(s) and/or is associated with an imbalance. For example, in some instances, a possible bet may be associated with a higher number of wagers, a higher total (aggregate) wager amount, and/or a higher expected payout (e.g., based on odds assigned to that possible bet and the total wager amount) than that of one or more of the remaining possible bet(s). If a possible bet has a disproportionately high risk value (e.g., wager count, wager value, and/or total payout amount), or if the risk value (e.g., wager count, wager value, and/or total payout) is too high, the system can scale down wager amounts associated with one or more associated Active Bet Slips. For example, as shown in FIG. 5, the participatory betting system can determine that possible bet 2 and/or possible bet 3 exceed the bet risk limit(s) by a factor of 10 and 2, respectively. As a result of proportional reductions (e.g., bet scaling) defined by a stake reduction factor(s), the participatory betting system can modify the wager amounts (e.g., bet sizes) of the selected Active Bet Slip(s) for possible bet 2 and possible bet 3, reducing each wager amount in proportion to the respective factor that the bet risk limit(s) is exceeded by. Thus, as shown in FIG. 5, the resulting wager amounts for the reduced aggregate bets can be 10 currency units for possible bet 1 (e.g., unscaled based on the possible bet 1 not exceeding the bet risk limit(s)), 100 currency units for possible bet 2, and 50 currency units for possible bet 3. An example of a stake reduction factor can include, for example, a percentage that can be defined based on an inverse of the ratio of a wager amount to the associated bet limit (e.g., an inverse of the factor by which the wager amount exceeds the bet limit).

In some implementations, although not shown in FIG. 5, the wager amounts for each of the bets included in a given Active Bet Slip can be scaled in a way that maintains the pre-scaling proportions of the bets. For example, the bet that exceeds a bet risk limit(s), or that needs to be scaled down the most based on the bet risk limit(s), can determine the scaling factor used for all bets on that Active Bet Slip. As a result, the participatory system can ignore a first risk value associated with a first bet from an Active Bet Slip, where that first risk value is below a predefined risk value threshold, if a second risk value associated with a second bet from the Active Bet Slip is above the predefined risk value threshold.

Figure 6:
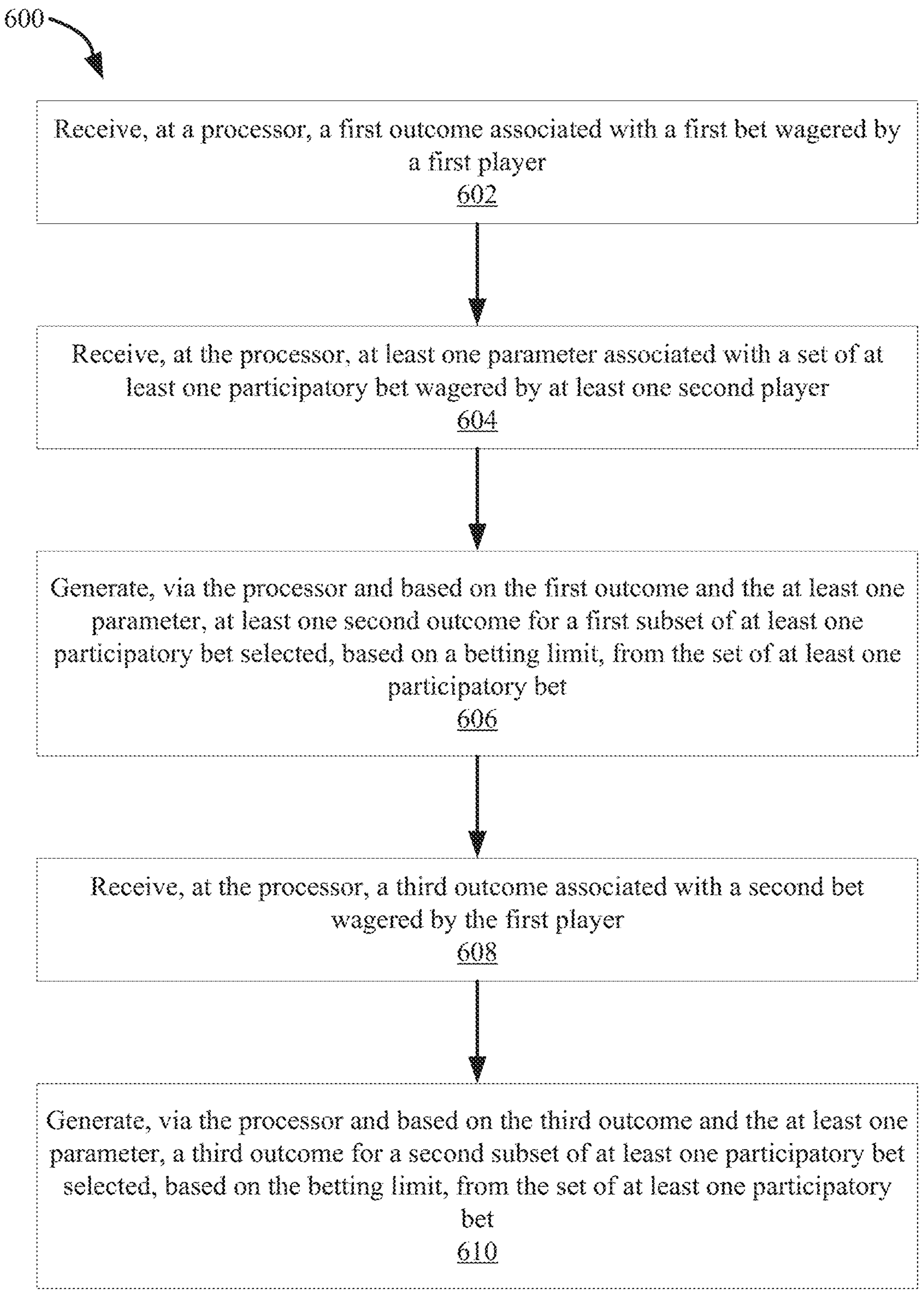
FIG. 6 shows a flowchart illustrating a method for facilitating participatory bets, according to some embodiments.

FIG. 6 shows a flowchart illustrating a method 600 for facilitating participatory bets, according to some embodiments. The method 600 can be implemented by a system described herein (e.g., the participatory betting system 10 of FIG. 1). Portions of the method 600 can be implemented using a processor (e.g., the processor 132 of FIG. 1) of any suitable compute device (e.g., the user compute device 130 of FIG. 1).

At 602, the method 600 includes receiving, at a processor, a first outcome associated with a first bet wagered by a first player. At 604, the method 600 includes receiving, at the processor, at least one parameter associated with a set of at least one participatory bet wagered by at least one second player. The at least one parameter can include, for example, a bet size parameter, a number of games parameter, a game extension configuration parameter, a game number extension parameter, and/or a bet size increase parameter. At 606, the method 600 includes generating, via the processor and based on the first outcome and the at least one parameter, at least one second outcome for a subset of at least one participatory bet selected, based on a betting limit, from the set of at least one participatory bet. The method 600 also includes, at 608, receiving, at the processor, a third outcome associated with a second bet wagered by the first player. The second bet can be wagered, for example, on a game subsequent to the game for which the first bet received at 602 was wagered. At 610, the method includes generating, via the processor and based on the third outcome and the at least one parameter, a third outcome for a second subset of at least one participatory bet selected, based on the betting limit, from the set of at least one participatory bet. For example, the third outcome can be generated automatically (e.g., without human intervention from the at least one second player) based on a game extension configuration parameter.

Figure 7:
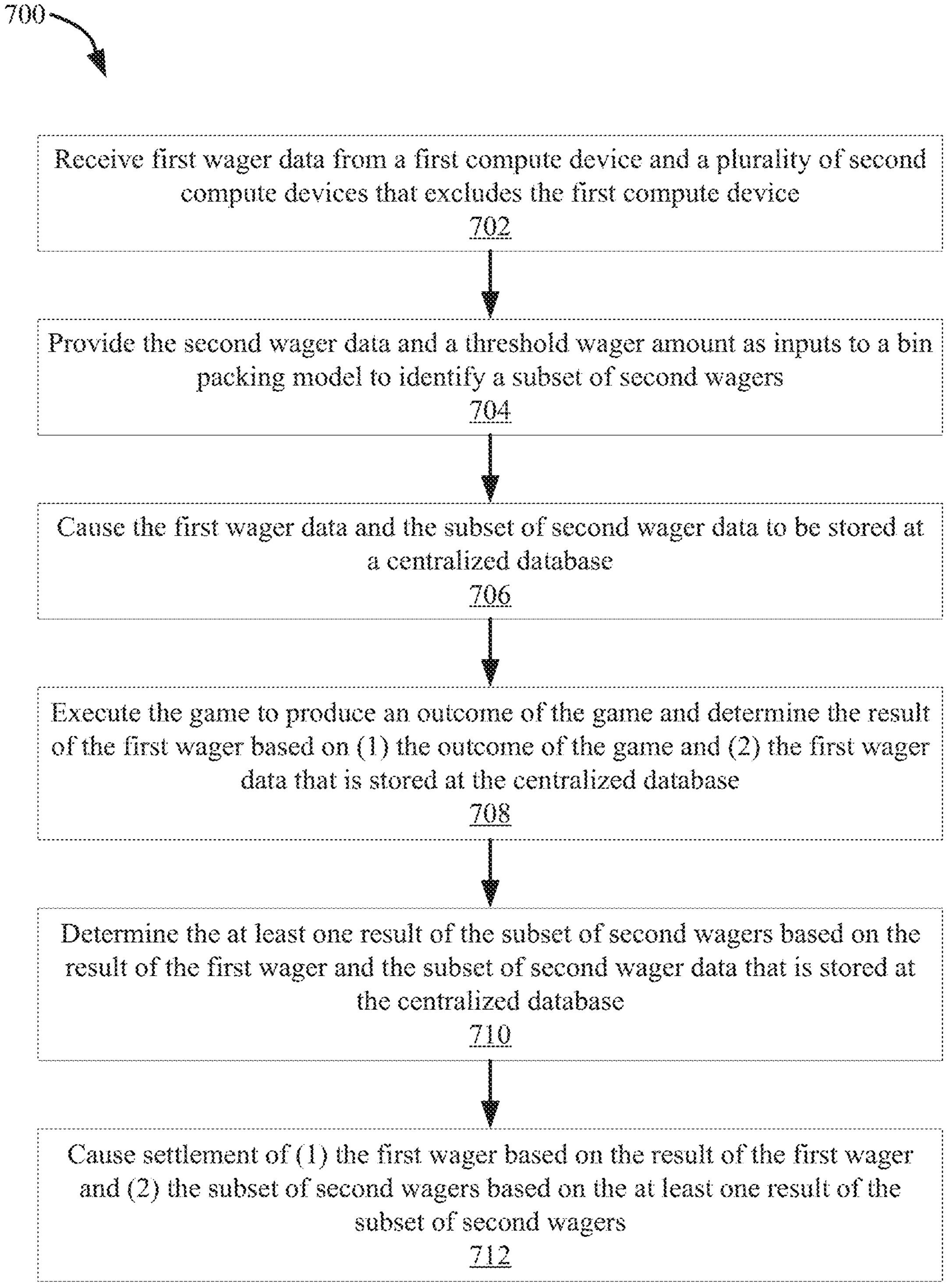
FIG. 7 shows a flowchart illustrating a method for settling a first wager based on a result of the first wager and settling a second wager based on the result of the first wager, according to some embodiments.

FIG. 7 shows a flowchart illustrating a method 700 for settling a first wager based on a result of the first wager and settling a second wager based on the result of the first wager, according to some embodiments. The method 700 can be implemented by a system described herein (e.g., the participatory betting system 10 of FIG. 1). Portions of the method 700 can be implemented using a processor (e.g., the processor 132 of FIG. 1) of any suitable compute device (e.g., the user compute device 130 of FIG. 1). The method 700 at 702 includes receiving (e.g., via at least one first network socket) (1) first wager data from a first compute device and (2) second wager data from a plurality of second compute devices that excludes the first compute device. The first wager data is associated with a first wager, and the second wager data is associated with a plurality of second wagers. Each second wager from the plurality of second wagers is associated with a second compute device different from remaining second compute devices from the plurality of second compute devices. At 704, the second wager data and a threshold wager amount are provided as inputs to a bin packing model to cause identification of a subset of second wagers from the plurality of second wagers. The subset of second wagers is associated with a subset of second wager data from the second wager data.

In response to the identification of the subset of second wagers, the method 700 at 706 includes causing the first wager data and the subset of second wager data to be stored (e.g., via a second network socket that is different from the at least one first network socket) at a centralized database. The game is executed at 708 to produce an outcome of the game, and the result of the first wager is determined based on (1) the outcome of the game and (2) the first wager data that is stored at the centralized database. At 710, the method 700 includes determining the at least one result of the subset of second wagers based on the result of the first wager and the subset of second wager data that is stored at the centralized database. At least one signal is sent at 712, via the at least one first network socket, to cause (1) settlement of the first wager based on the result of the first wager and (2) settlement of the subset of second wagers based on the at least one result of the subset of second wagers.

Figure 8:
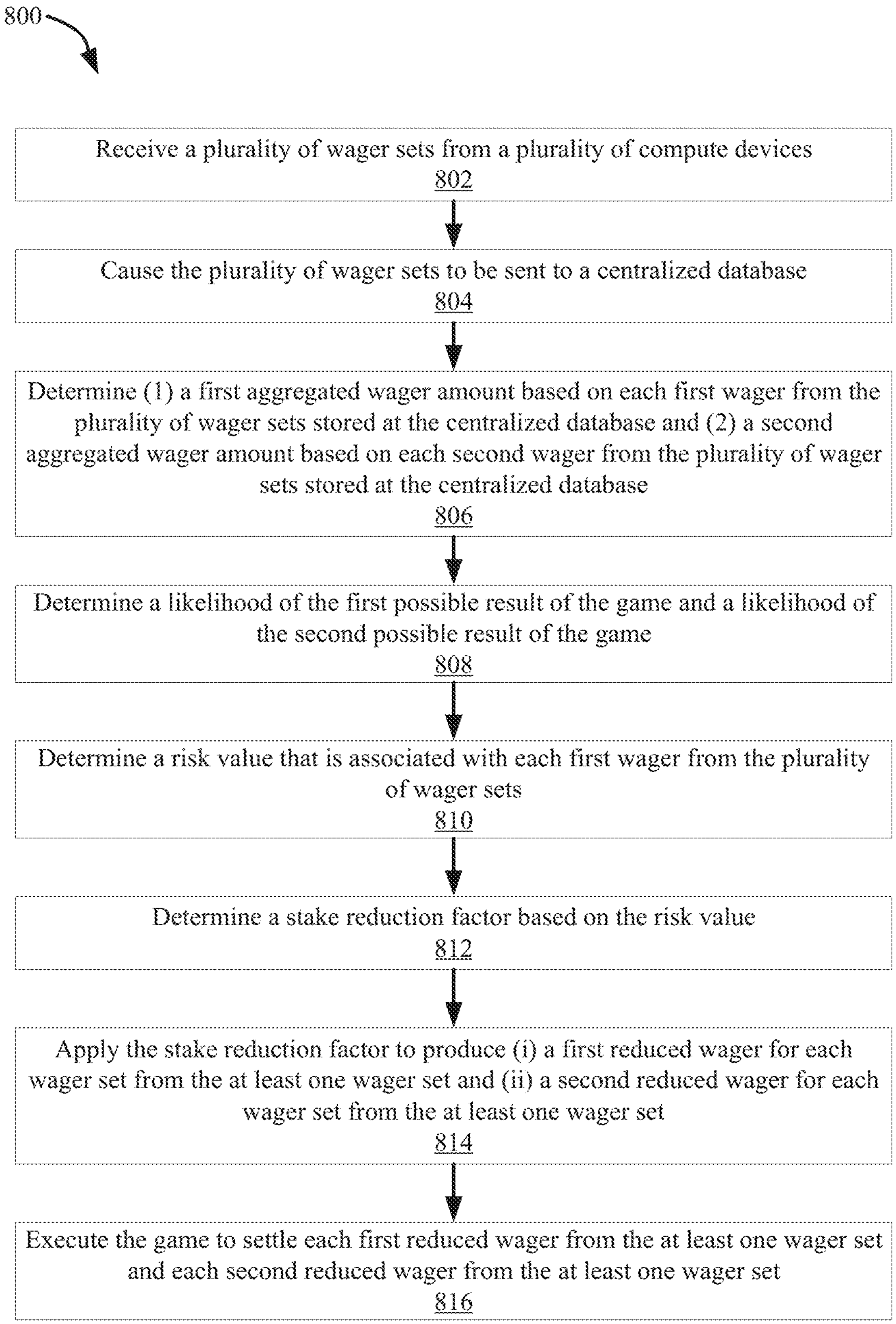
FIG. 8 shows a flowchart illustrating a method for reducing wagers based on a stake reduction factor, according to an embodiment.

FIG. 8 shows a flowchart illustrating a method 800 for reducing wagers based on a stake reduction factor, according to an embodiment. The method 800 can be implemented by a system described herein (e.g., the participatory betting system 10 of FIG. 1). Portions of the method 800 can be implemented using a processor (e.g., the processor 132 of FIG. 1) of any suitable compute device (e.g., the user compute device 130 of FIG. 1). The method 800 at 802 includes receiving, via at least one first network socket, a plurality of wager sets from a plurality of compute devices. Each wager set from the plurality of wager sets (1) is associated with a compute device different from remaining compute devices from the plurality of compute devices and (2) includes a plurality of wagers that includes (i) a first wager that is associated with a first possible result of a game and (ii) a second wager that is associated with a second possible result of the game that is different from the first possible result of the game. At 804, the method 800 includes causing the plurality of wager sets to be sent, via a second network socket that is different from the at least one first network socket, to a centralized database. A first aggregated wager amount is determined at 806 based on each first wager from the plurality of wager sets stored at the centralized database, and a second aggregated wager amount is further determined at 806 based on each second wager from the plurality of wager sets stored at the centralized database.

The method 800, at 808, includes determining a likelihood of the first possible result of the game and a likelihood of the second possible result of the game, based on a plurality of possible results of the game that includes the first possible result of the game and second possible result of the game. A risk value that is associated with each first wager from the plurality of wager sets is determined at 810 based on the first aggregated wager amount, the second aggregated wager amount, the likelihood of the first possible result of the game, and the likelihood of the second possible result of the game. In response to the risk value being above a predefined risk value threshold, a stake reduction factor is determined at 812 based on the risk value. At 814, in response to determining the stake reduction factor, the stake reduction factor is applied, at the centralized database, to (1) each first wager from at least one wager set from the plurality of wager sets and (2) each second wager from the at least one wager set, to produce (i) a first reduced wager for each wager set from the at least one wager set and (ii) a second reduced wager for each wager set from the at least one wager set. The game is executed at 816 to determine an outcome of the game from the plurality of possible results of the game, and each first reduced wager from the at least one wager set and each second reduced wager from the at least one wager set is settled based on the outcome of the game.

Figure 9:
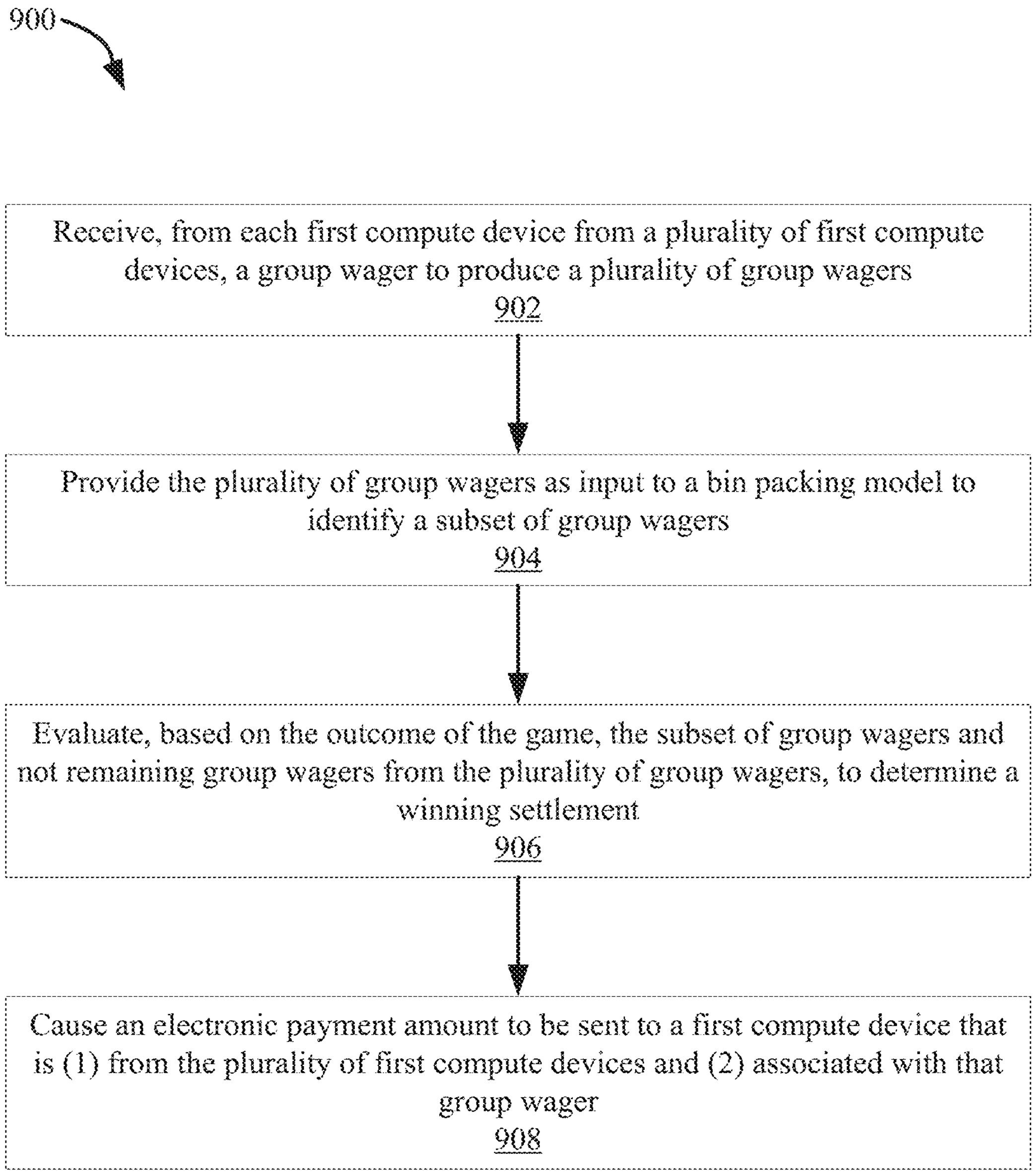
FIG. 9 shows a flowchart illustrating a method for identifying a subset of group wagers using a bin packing model, according to some embodiments.

FIG. 9 shows a flowchart illustrating a method 900 for identifying a subset of group wagers using a bin packing model, according to some embodiments. The method 900 can be implemented by a system described herein (e.g., the participatory betting system 10 of FIG. 1). Portions of the method 900 can be implemented using a processor (e.g., the processor 132 of FIG. 1) of any suitable compute device (e.g., the user compute device 130 of FIG. 1). The method 900 at 902 includes receiving, from each first compute device from a plurality of first compute devices, a group wager to produce a plurality of group wagers. Each group wager from the plurality of group wagers has (1) a wager amount that is defined at that first compute device and (2) a condition that is based on an outcome of a game that is played by a user of a second compute device that is not included in the plurality of first compute devices. The plurality of group wagers is provided as input at 904 to a bin packing model to identify a subset of group wagers from the plurality of group wagers based on a threshold wager amount. In response to executing the game to produce the outcome of the game, the method 900 at 906 includes evaluating, based on the outcome of the game, the subset of group wagers and not remaining group wagers from the plurality of group wagers, to determine a winning settlement. In response to determining the winning settlement, at 908, an electronic payment amount is sent to a first compute device that is (1) from the plurality of first compute devices and (2) associated with that group wager, the electronic payment amount being based on the wager amount of that group wager.

According to an embodiment, a non-transitory, processor-readable medium stores instructions that, when executed by a processor, cause the processor to receive, via at least one first network socket, (1) first wager data from a first compute device and (2) second wager data from a plurality of second compute devices that excludes the first compute device. The first wager data is associated with a first wager, and the second wager data is associated with a plurality of second wagers. Each second wager from the plurality of second wagers is associated with a second compute device different from remaining second compute devices from the plurality of second compute devices. The second wager data and a threshold wager amount are provided as inputs to a bin packing model to cause identification of a subset of second wagers from the plurality of second wagers. The subset of second wagers is associated with a subset of second wager data from the second wager data.

In response to the identification of the subset of second wagers, the instructions further cause the processor to (1) set a rule specifying that at least one result of the subset of second wagers is based on a result of the first wager and (2) cause the first wager data and the subset of second wager data to be stored, via a second network socket that is different from the at least one first network socket, at a centralized database. The game is executed to produce an outcome of the game, and the result of the first wager is determined based on the outcome of the game and the first wager data that is stored at the centralized database. The instructions further cause the processor to determine the at least one result of the subset of second wagers based on the result of the first wager and the subset of second wager data that is stored at the centralized database. At least one signal is sent, via the at least one first network socket, to cause (1) settlement of the first wager based on the result of the first wager and (2) settlement of the subset of second wagers based on the at least one result of the subset of second wagers.

In some implementations, the game can be associated with a first game instance, and the non-transitory, processor-readable medium can further store instructions to cause the processor to receive a game extension parameter from a second compute device that is from the plurality of second compute devices. In response to determining that a result from the at least one result of the subset of second wagers is a winning result, the winning result being associated with the second compute device, a settlement amount can be determined based on a portion of the second wager data that is associated with the second compute device. The settlement amount can be partitioned, based on the game extension parameter, into a payout amount and a re-wager amount, and in response to determining that the re-wager amount is not less than a wager amount indicated in the portion of the second wager data, the instructions can further cause the processor to automatically cause electronic payment of the settlement amount to a user associated with the second compute device. Third wager data can be automatically generated based on the re-wager amount, the third wager data being associated with a second game instance that is different from the first game instance.

In some implementations, the non-transitory, processor-readable medium can further store instructions to cause the processor to increase the re-wager amount in response to (1) partitioning the settlement amount and (2) determining that the re-wager amount is less than the wager amount indicated in the portion of the second wager data. The increasing of the re-wager amount can be based on a result of a third wager that is (1) associated with the second compute device and (2) a winning result, to produce an increased re-wager amount that is not less than the wager amount indicated in the portion of the second wager data. The instructions can further cause the processor to automatically generate the third wager data in response to producing the increased re-wager amount.

In some implementations, the game can be associated with a first game instance, and the non-transitory, processor-readable medium can further store instructions to cause the processor to receive a wager size increase parameter from a second compute device that is from the plurality of second compute devices. In response to determining that a result from the at least one result of the subset of second wagers is a winning result, the winning result being associated with the second compute device, third wager data can be automatically generated based on the wager size increase parameter, the third wager data (1) being associated with a second game instance that is different from the first game instance and (2) indicating a first wager amount that is higher than a second wager amount that is associated with (i) the second compute device and (ii) the first game instance.

In some implementations, the non-transitory, processor-readable medium can further store instructions to cause the processor to prevent further wager data from being generated for a second game instance, in response to determining that the result from the at least one result of the subset of second wagers is a losing result. In some implementations, the second wager data can include a plurality of wager amounts, each wager amount from the plurality of wager amounts being associated with a second compute device different from remaining second compute devices from the plurality of second compute devices. The instructions to cause the processor to provide (1) the second wager data and (2) the threshold wager amount as inputs to the bin packing model include instructions to cause the processor to provide the plurality of wager amounts as inputs to the bin packing model to identify the subset of second wagers that has an aggregated wager amount that is less than the threshold wager amount. In some implementations, the bin packing model can be a harmonic-k model. In some implementations, the at least one first network socket can be associated with a first permission level that excludes access to the centralized database, and the second network socket can be associated with a second permission level that includes access to the centralized database.

In some implementations, the non-transitory, processor-readable medium can further store instructions to cause the processor to receive, via a first graphical user interface (GUI) that is executed at the first compute device, a request for a first user to participate in the game. In response to receiving the request, the instructions can further cause the processor to automatically cause display, via a plurality of second GUIs that are executed via the plurality of second compute devices, of a user-selectable element to permit a plurality of second users to generate the plurality of second wagers. In some implementations, the game can be a casino game. In some implementations, the result can be a first result, the second wager data can have a first aggregated wager amount, the second wager data can be associated with the first result, and the non-transitory, processor-readable medium can further store instructions to cause the processor to receive, via the at least one first network socket, third wager data from a plurality of third compute devices, the plurality of third compute devices excluding the first compute device and the plurality of second compute devices, the third wager data being associated with a plurality of third wagers that (1) is associated with a second result of the game that is different than the first result of the game and (2) has a second aggregated wager amount. In response to determining that the second aggregated wager amount is greater than the first aggregated wager amount by a predefined factor, the instructions can further cause the processor to generate the threshold wager amount based on a difference between the first aggregated wager amount and the second aggregated wager amount.

In some implementations, the non-transitory, processor-readable medium can further store instructions to cause the processor to prevent the subset of second wager data from being modified in response to identifying the subset of second wagers. In some implementations, the non-transitory, processor-readable medium can further store instructions to cause the processor to (1) receive a multiplier value from a third compute device that is different from the first compute device and this is not included in the plurality of second compute devices, and (2) determine at least one settlement amount based on the multiplier value. The instructions to cause the processor to cause the first wager and the subset of second wagers to settle can include instructions to, in response to the result of the first wager being a winning result, cause the processor to cause electronic payment of the at least one settlement amount to (1) a first user associated with the first compute device and (2) at least one second user associated with a subset of second compute devices that is from the plurality of second compute devices and that is associated with the subset of second wagers.

In some implementations, the subset of second wagers can be a first subset of second wagers, the game can be associated with a first game instance, and the non-transitory, processor-readable medium can further store instructions to cause the processor to, in response to identifying the first subset of second wagers from the plurality of second wagers, provide remaining second wager data from the second wager data as input to the bin packing model to identify a second subset of second wagers from the plurality of second wagers, the remaining second wager data being mutually exclusive of the subset of second wager data. The instructions can further cause the processor to cause the second subset of second wagers to be associated with a second game instance that is different from the first game instance.

According to an embodiment, a non-transitory, processor-readable medium stores instructions that, when executed by a processor, cause the processor to receive, via at least one first network socket, a plurality of wager sets from a plurality of compute devices, each wager set from the plurality of wager sets (1) being associated with a compute device different from remaining compute devices from the plurality of compute devices and (2) including a plurality of wagers that includes (i) a first wager that is associated with a first possible result of a game and (ii) a second wager that is associated with a second possible result of the game that is different from the first possible result of the game. The instructions further cause the processor to cause the plurality of wager sets to be sent, via a second network socket that is different from the at least one first network socket, to a centralized database. A first aggregated wager amount is determined based on each first wager from the plurality of wager sets stored at the centralized database, and a second aggregated wager amount is determined based on each second wager from the plurality of wager sets stored at the centralized database.

The instructions further cause the processor to determine a likelihood of the first possible result of the game and a likelihood of the second possible result of the game, based on a plurality of possible results of the game that includes the first possible result of the game and second possible result of the game. A risk value that is associated with each first wager from the plurality of wager sets is determined based on the first aggregated wager amount, the second aggregated wager amount, the likelihood of the first possible result of the game, and the likelihood of the second possible result of the game. In response to the risk value being above a predefined risk value threshold, a stake reduction factor is determined based on the risk value. In response to determining the stake reduction factor, the stake reduction factor is applied, at the centralized database, to (1) each first wager from at least one wager set from the plurality of wager sets and (2) each second wager from the at least one wager set, to produce (i) a first reduced wager for each wager set from the at least one wager set and (ii) a second reduced wager for each wager set from the at least one wager set. The game is executed to determine an outcome of the game from the plurality of possible results of the game, and each first reduced wager from the at least one wager set and each second reduced wager from the at least one wager set is settled based on the outcome of the game.

In some implementations, the game can include a wager amount choice and a plurality of possible result choices. In some implementations, the non-transitory, processor-readable medium can further store instructions to cause the processor to identify the at least one wager set from the plurality of wager sets based on the at least one wager set being received at the processor within a predefined time period. In some implementations, each wager set from the plurality of wager sets can include a bet slip different from remaining bet slips from a plurality of bet slips. In some implementations, the risk value can be a first risk value, and the non-transitory, processor-readable medium can further store instructions to cause the processor to determine a second risk value that is associated with each second wager from the plurality of wager sets based on the first aggregated wager amount, the second aggregated wager amount, the likelihood of the first possible result of the game, and the likelihood of the second possible result of the game. In response to the first risk value being above the predefined risk value threshold, the instructions can further cause the processor to ignore the second risk value to produce the second reduced wager for each wager set from the at least one wager set.

According to an embodiment, a non-transitory, processor-readable medium stores instructions that, when executed by a processor, cause the processor to receive, from each first compute device from a plurality of first compute devices, a group wager to produce a plurality of group wagers, each group wager from the plurality of group wagers having (1) a wager amount that is defined at that first compute device and (2) a condition that is based on an outcome of a game that is played by a user of a second compute device that is not included in the plurality of first compute devices. The plurality of group wagers is provided as input to a bin packing model to identify a subset of group wagers from the plurality of group wagers based on a threshold wager amount. In response to executing the game to produce the outcome of the game, the instructions further cause the processor to evaluate, based on the outcome of the game, the subset of group wagers and not remaining group wagers from the plurality of group wagers, to determine a winning settlement. In response to determining the winning settlement, an electronic payment amount is sent to a first compute device that is (1) from the plurality of first compute devices and (2) associated with that group wager, the electronic payment amount being based on the wager amount of that group wager.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A non-transitory, processor-readable medium storing instructions that, when executed by a processor, cause the processor to:

receive, via at least one first network socket, (1) first wager data from a first compute device and (2) second wager data from a plurality of second compute devices that excludes the first compute device, the first wager data being associated with a first wager, and the second wager data being associated with a plurality of second wagers, each second wager from the plurality of second wagers being associated with a second compute device different from remaining second compute devices from the plurality of second compute devices;

provide (1) the second wager data and (2) a threshold wager amount as inputs to a bin packing model to cause identification of a subset of second wagers from the plurality of second wagers, the subset of second wagers being associated with a subset of second wager data from the second wager data;

in response to the identification of the subset of second wagers, set a rule specifying that at least one result of the subset of second wagers is based on a result of the first wager;

cause the first wager data and the subset of second wager data to be stored, via a second network socket that is different from the at least one first network socket, at a centralized database;

execute a game to produce an outcome of the game;

determine the result of the first wager based on the outcome of the game and the first wager data that is stored at the centralized database;

determine the at least one result of the subset of second wagers based on the result of the first wager and the subset of second wager data that is stored at the centralized database; and automatically cause at least one signal to be sent, via the at least one first network socket, to cause (1) settlement of the first wager based on the result of the first wager and (2) settlement of the subset of second wagers based on the at least one result of the subset of second wagers.

2. The non-transitory, processor-readable medium of claim 1, wherein the game is associated with a first game instance, and the non-transitory, processor-readable medium further stores instructions to cause the processor to:

receive a game extension parameter from a second compute device that is from the plurality of second compute devices; and in response to determining that a result from the at least one result of the subset of second wagers is a winning result, the winning result being associated with the second compute device:

determine a settlement amount based on a portion of the second wager data that is associated with the second compute device, partition the settlement amount, based on the game extension parameter, into a payout amount and a re-wager amount, and in response to (1) partitioning the settlement amount and (2) determining that the re-wager amount is not less than a wager amount indicated in the portion of the second wager data:

automatically cause electronic payment of the settlement amount to a user associated with the second compute device, and automatically generate third wager data based on the re-wager amount, the third wager data being associated with a second game instance that is different from the first game instance.

3. The non-transitory, processor-readable medium of claim 2, further storing instructions to cause the processor to:

in response to (1) partitioning the settlement amount and (2) determining that the re-wager amount is less than the wager amount indicated in the portion of the second wager data:

increase the re-wager amount based on a result of a third wager that is (1) associated with the second compute device and (2) a winning result, to produce an increased re-wager amount that is not less than the wager amount indicated in the portion of the second wager data, and automatically generate the third wager data in response to producing the increased re-wager amount.

4. The non-transitory, processor-readable medium of claim 1, wherein the game is associated with a first game instance, and the non-transitory, processor-readable medium further stores instructions to cause the processor to:

receive a wager size increase parameter from a second compute device that is from the plurality of second compute devices; and in response to determining that a result from the at least one result of the subset of second wagers is a winning result, the winning result being associated with the second compute device:

automatically generate third wager data based on the wager size increase parameter, the third wager data (1) being associated with a second game instance that is different from the first game instance and (2) indicating a first wager amount that is higher than a second wager amount that is associated with (i) the second compute device and (ii) the first game instance.

5. The non-transitory, processor-readable medium of claim 4, further storing instructions to cause the processor to:

in response to determining that the result from the at least one result of the subset of second wagers is a losing result, prevent further wager data from being generated for a second game instance.

6. The non-transitory, processor-readable medium of claim 1, wherein:

the second wager data includes a plurality of wager amounts, each wager amount from the plurality of wager amounts being associated with a second compute device different from remaining second compute devices from the plurality of second compute devices;

the instructions to cause the processor to provide (1) the second wager data and (2) the threshold wager amount as inputs to the bin packing model include instructions to cause the processor to provide the plurality of wager amounts as inputs to the bin packing model to identify the subset of second wagers that has an aggregated wager amount; and the aggregated wager amount is less than the threshold wager amount.

7. The non-transitory, processor-readable medium of claim 1, wherein the bin packing model is a harmonic-k model.

8. The non-transitory, processor-readable medium of claim 1, wherein:

the at least one first network socket is associated with a first permission level that excludes access to the centralized database; and the second network socket is associated with a second permission level that includes access to the centralized database.

9. The non-transitory, processor-readable medium of claim 1, further storing instructions to cause the processor to:

receive, via a first graphical user interface (GUI) that is executed at the first compute device, a request for a first user to participate in the game; and in response to receiving the request, automatically cause display, via a plurality of second GUIs that are executed via the plurality of second compute devices, of a user-selectable element to permit a plurality of second users to generate the plurality of second wagers.

10. The non-transitory, processor-readable medium of claim 1, wherein the game is a casino game.

11. The non-transitory, processor-readable medium of claim 1, wherein:

the result is a first result;

the second wager data has a first aggregated wager amount;

the second wager data is associated with the first result; and the non-transitory, processor-readable medium further stores instructions to cause the processor to:

receive, via the at least one first network socket, third wager data from a plurality of third compute devices, the plurality of third compute devices excluding the first compute device and the plurality of second compute devices, the third wager data being associated with a plurality of third wagers that (1) is associated with a second result of the game that is different than the first result of the game and (2) has a second aggregated wager amount, and in response to determining that the second aggregated wager amount is greater than the first aggregated wager amount by a predefined factor, generate the threshold wager amount based on a difference between the first aggregated wager amount and the second aggregated wager amount.

12. The non-transitory, processor-readable medium of claim 1, further storing instructions to cause the processor to:

in response to identifying the subset of second wagers, prevent the subset of second wager data from being modified.

13. The non-transitory, processor-readable medium of claim 1, wherein:

the non-transitory, processor-readable medium further stores instructions to cause the processor to:

receive a multiplier value from a third compute device that is different from the first compute device and this is not included in the plurality of second compute devices, and determine at least one settlement amount based on the multiplier value; and the instructions to cause the processor to cause the first wager and the subset of second wagers to settle include instructions to, in response to the result of the first wager being a winning result, cause the processor to cause electronic payment of the at least one settlement amount to (1) a first user associated with the first compute device and (2) at least one second user associated with a subset of second compute devices that is from the plurality of second compute devices and that is associated with the subset of second wagers.

14. The non-transitory, processor-readable medium of claim 1, wherein the subset of second wagers is a first subset of second wagers, the game is associated with a first game instance, and the non-transitory, processor-readable medium further stores instructions to cause the processor to:

in response to identifying the first subset of second wagers from the plurality of second wagers, provide remaining second wager data from the second wager data as input to the bin packing model to identify a second subset of second wagers from the plurality of second wagers, the remaining second wager data being mutually exclusive of the subset of second wager data; and cause the second subset of second wagers to be associated with a second game instance that is different from the first game instance.

15. A method, comprising:

receiving, at a processor, (1) first wager data from a first compute device and (2) second wager data from a plurality of second compute devices that excludes the first compute device, the first wager data being associated with a first wager, and the second wager data being associated with a plurality of second wagers, each second wager from the plurality of second wagers being associated with a second compute device different from remaining second compute devices from the plurality of second compute devices;

providing, via the processor, (1) the second wager data and (2) a threshold wager amount as inputs to a bin packing model to cause identification of a subset of second wagers from the plurality of second wagers, the subset of second wagers being associated with a subset of second wager data from the second wager data;

in response to the identification of the subset of second wagers, setting, via the processor, a rule specifying that at least one result of the subset of second wagers is based on a result of the first wager;

causing, via the processor, the first wager data and the subset of second wager data to be stored at a centralized database;

executing, via the processor, a game to produce an outcome of the game;

determining, via the processor, the result of the first wager based on the outcome of the game and the first wager data that is stored at the centralized database;

determining, via the processor, the at least one result of the subset of second wagers based on the result of the first wager and the subset of second wager data that is stored at the centralized database; and automatically causing, via the processor, at least one signal to be sent to cause (1) settlement of the first wager based on the result of the first wager and (2)

settlement of the subset of second wagers based on the at least one result of the subset of second wagers.

16. The method of claim 15, wherein the game is associated with a first game instance, the method further comprising:

receiving, via the processor, a game extension parameter from a second compute device that is from the plurality of second compute devices; and in response to determining that a result from the at least one result of the subset of second wagers is a winning result, the winning result being associated with the second compute device:

determining, via the processor, a settlement amount based on a portion of the second wager data that is associated with the second compute device, partitioning, via the processor, the settlement amount into a payout amount and a re-wager amount based on the game extension parameter, and in response to (1) partitioning the settlement amount and (2) determining that the re-wager amount is not less than a wager amount indicated in the portion of the second wager data:

automatically causing, via the processor, electronic payment of the settlement amount to a user associated with the second compute device, and automatically generating, via the processor, third wager data based on the re-wager amount, the third wager data being associated with a second game instance that is different from the first game instance.

17. The method of claim 16, further comprising:

in response to (1) partitioning the settlement amount and (2) determining that the re-wager amount is less than the wager amount indicated in the portion of the second wager data:

increasing, via the processor, the re-wager amount based on a result of a third wager that is (1) associated with the second compute device and (2) a winning result, to produce an increased re-wager amount that is not less than the wager amount indicated in the portion of the second wager data, and automatically generating, via the processor, the third wager data in response to producing the increased re-wager amount.

18. The method of claim 15, wherein the game is associated with a first game instance, the method further comprising:

receiving, via the processor, a wager size increase parameter from a second compute device that is from the plurality of second compute devices; and in response to determining that a result from the at least one result of the subset of second wagers is a winning result, the winning result being associated with the second compute device:

automatically generating, via the processor, third wager data based on the wager size increase parameter, the third wager data (1) being associated with a second game instance that is different from the first game instance and (2) indicating a first wager amount that is higher than a second wager amount that is associated with (i) the second compute device and (ii) the first game instance.

19. The method of claim 15, further comprising:

in response to determining that the result from the at least one result of the subset of second wagers is a losing result, preventing, via the processor, further wager data from being generated for a second game instance.

20. The method of claim 15, further comprising:

receiving, via the processor and a first graphical user interface (GUI) that is executed at the first compute device, a request for a first user to participate in the game; and in response to receiving the request, automatically causing display, via the processor and a plurality of second GUIs that are executed via the plurality of second compute devices, of a user-selectable element to permit a plurality of second users to generate the plurality of second wagers.

* * * * *